US012589441B2

(12) United States Patent　　(10) Patent No.: US 12,589,441 B2
Miyanaga　　(45) Date of Patent: Mar. 31, 2026

(54) LIQUID CIRCULATION SYSTEM AND BORING SYSTEM INCLUDING THE SAME

(71) Applicant: KABUSHIKI KAISHA MIYANAGA, Miki (JP)

(72) Inventor: Kiyoshi Miyanaga, Miki (JP)

(73) Assignee: KABUSHIKI KAISHA MIYANAGA, Miki (JP)

( * ) Notice: Subject to any disclaimer, the term of this patent is extended or adjusted under 35 U.S.C. 154(b) by 547 days.

(21) Appl. No.: 18/040,483

(22) PCT Filed: Jun. 7, 2021

(86) PCT No.: PCT/JP2021/021583
§ 371 (c)(1),
(2) Date: Feb. 3, 2023

(87) PCT Pub. No.: WO2022/030095
PCT Pub. Date: Feb. 10, 2022

(65) Prior Publication Data
US 2023/0271262 A1　　Aug. 31, 2023

(30) Foreign Application Priority Data

Aug. 6, 2020　(JP) ................................. 2020-133561
Nov. 6, 2020　(JP) ................................. 2020-185628

(51) Int. Cl.
*B23B 39/00*　　(2006.01)
(52) U.S. Cl.
CPC .......... *B23B 39/00* (2013.01); *B23B 2250/12* (2013.01)

(58) Field of Classification Search
CPC . B23B 39/00; B23B 2250/12; B23Q 11/0046; B23Q 11/1069
See application file for complete search history.

(56) References Cited

U.S. PATENT DOCUMENTS

| 2002/0027023 A1 | 3/2002 | Britz |
| 2008/0087333 A1 | 4/2008 | Pfeiffer et al. |
| 2011/0192803 A1 | 8/2011 | Holzmeier et al. |
| 2017/0129138 A1 | 5/2017 | Sever et al. |

FOREIGN PATENT DOCUMENTS

| EP | 1193026 A1 | 4/2002 |
| EP | 2335897 A1 | 6/2011 |
| EP | 2960012 A1 | 12/2015 |
| JP | H07108524 A | 4/1995 |
| JP | H10612 A | 1/1998 |
| JP | 2001138117 A | 5/2001 |
| JP | 2002337136 A | 11/2002 |
| JP | 2018108626 A | 7/2018 |

*Primary Examiner* — Benjamin M Kurtz
(74) *Attorney, Agent, or Firm* — Alleman Hall LLP

(57)　　ABSTRACT

Provided is a liquid circulation system including: a shield that covers a boring area of a workpiece in which a hole is bored with a tip of a bit attached to a boring device; a liquid container that holds a liquid; a liquid feeder that forcibly feeds the liquid held in the liquid container to the tip; and a liquid collector that forcibly collects a liquid suspension from an area shielded by the shield and returns the liquid suspension to the liquid container. The liquid circulation system is able to ensure liquid circulation while reliably preventing backflow of the liquid suspension.

8 Claims, 8 Drawing Sheets

LIQUID CIRCULATION SYSTEM AND BORING SYSTEM INCLUDING THE SAME

TECHNICAL FIELD

The present invention relates to a liquid circulation system and a boring system including the liquid circulation system.

BACKGROUND ART

Some conventional boring devices used to bore a hole in a workpiece such as a concrete material or porcelain tile are designed to supply a liquid from a tip of a bit to a boring area of the workpiece. An example of this type of prior art is a portable circulation filtration device including a liquid feeder for feeding a liquid to a tip of a boring device and a separator for separating chips (swarf) of a boring area of a workpiece from a liquid suspension which is a mixture of the liquid fed from the tip to the boring area and the chips of the workpiece (see Patent Literature 1, for example).

In the portable circulation filtration device of Patent Literature 1, the liquid suspension leaving the boring area of the workpiece is delivered to a filter of the portable circulation filtration device through a liquid suspension collector and an outlet tube. In the portable circulation filtration device, the chips of the workpiece are separated from the liquid suspension by the filter, and the liquid to be fed to the boring device is recovered.

CITATION LIST

Patent Literature

PTL 1: Japanese Laid-Open Patent Application Publication No. 2002-337136

SUMMARY OF INVENTION

Technical Problem

In the portable circulation filtration device proposed in Patent Literature 1, the liquid suspension leaving the boring area of the workpiece is received into the liquid suspension collector, from which the liquid suspension is delivered to the separator through the outlet tube. In this case, the liquid suspension discharged from the liquid suspension collector into the outlet tube could flow back to the liquid suspension collector depending on the amount of the discharged liquid suspension.

It is therefore an object of the present invention to provide a liquid circulation system able to ensure liquid circulation while reliably preventing backflow of a liquid suspension and a boring system including the liquid circulation system.

Solution to Problem

In order to achieve the above object, a liquid circulation system according to the present invention includes: a shield that covers a boring area of a workpiece in which a hole is bored with a tip of a bit attached to a boring device; a liquid container that holds a liquid; a liquid feeder that forcibly feeds the liquid held in the liquid container to the tip; and a liquid collector that forcibly collects a liquid suspension from an area shielded by the shield and returns the liquid suspension to the liquid container. The term "liquid suspension" as used in the specification and the claims refers to a liquid mixture of the liquid fed to the tip and chips of the workpiece subjected to hole boring with the tip.

In the above configuration, the shield covers the boring area of the workpiece in which a hole is bored with the tip of the bit attached to the boring device, the liquid feeder forcibly feeds the liquid to the tip, and the liquid collector forcibly collects the liquid suspension from the area shielded by the shield. Thus, backflow of the liquid suspension can be reliably prevented.

The liquid feeder may include a first tube pump that forcibly feeds part of the liquid held in the liquid container to the tip, the liquid collector may include a second tube pump that forcibly collects the liquid suspension from the area shielded by the shield into the liquid container, and the liquid circulation system may further include a switch to activate and stop the first and second tube pumps in conjunction with each other. In this configuration, forcible feed of the liquid by the first tube pump and forcible collection of the liquid suspension by the second tube pump can be effected in conjunction with each other by operating the switch, and this ensures proper circulation of the liquid. Additionally, the use of the tube pumps for liquid circulation allows for proper delivery of the liquid suspension containing the chips resulting from hole boring with the tip.

The liquid circulation system may further include a strainer located in a liquid collection channel extending between the shield and the second tube pump. In this configuration, when a boring operation is performed during which the chips resulting from hole boring with the tip could include large fragments, the large fragments can be removed by the strainer.

The liquid collection channel may include a portion extending between the shield and the strainer, and the portion of the liquid collection channel may be sized to match fragments of the workpiece which are discharged out of the shield. In this configuration, when a boring operation is performed during which the chips resulting from hole boring with the tip could include large fragments, the large fragments can be carried smoothly from the shield to the strainer in the liquid collection channel and removed by the strainer.

The shield may include a sealing member placeable around the boring area and in contact with the workpiece. In this configuration, the liquid forcibly fed to the tip by the liquid feeder can be reliably prevented from leaking through a gap between the shield and the workpiece.

A boring system according to the present invention includes the liquid circulation system as defined above, wherein the boring device includes: a liquid feed mechanism that opens and closes a feed channel for the liquid fed by the liquid feeder; and a biasing mechanism that biases the shield forward.

In this configuration, it is possible to forcibly feed the liquid to the tip by the liquid feeder of the liquid circulation system, forcibly collect the liquid suspension from the boring area by the liquid collector, and hold the collected suspension in the liquid container. The liquid fed to the tip of the boring device can be separated by a separator from the liquid suspension held in the liquid container and can be circulated to the tip. Additionally, the shield can be properly pressed against the workpiece by the action of the biasing mechanism, and in this state the feed channel for the liquid can be opened by the liquid feed mechanism to feed the liquid to the tip.

The liquid feed mechanism may include a sliding member movable a given distance backward in the boring device together with the bit, and the feed channel may be opened in response to the sliding member moving the given distance. In this configuration, once the bit is pressed against the workpiece to bore a hole with the boring device, the sliding member moves the given distance backward in the boring device together with the bit to open the liquid feed channel of the liquid feed mechanism. Thus, the liquid can be fed to the tip of the bit in time with the boring operation.

The tip of the bit may be located away from a front surface of the shield in a direction toward the liquid feed mechanism, with a given width of initial gap being defined between the tip and the front surface of the shield, and the given distance moved by the sliding member of the liquid feed mechanism may be smaller than the initial gap. In this configuration, the feed channel for the liquid is opened after the shield is pressed against the workpiece to bore a hole. Thus, the boring operation can be performed while feeding the liquid to the working piece against which the shield is being pressed with a suitable force.

The biasing mechanism may include: a guide extending from the boring device toward the shield; a slider having a front end to which the shield is secured, the slider being slidable under guidance of the guide; a biaser that biases the slider forward along the guide; and a holder that holds the slider at a given position. In this configuration, the shield secured to the front end of the slider is biased forward by the biaser along the guide extending from the boring device toward the shield. Thus, a boring operation with the bit can be performed on the workpiece against which the shield is being pressed.

Advantageous Effects of Invention

The present invention can provide a liquid circulation system able to ensure liquid circulation while reliably preventing backflow of a liquid suspension and a boring system including the liquid circulation system.

BRIEF DESCRIPTION OF DRAWINGS

FIG. 4A is a schematic view of the shield as viewed from the direction of the boring device, and FIG. 4B is a cross-sectional view of the shield taken along a vertical plane passing through the center of the shield.

FIG. 6A is a schematic cross-sectional view showing a state before the boring operation, and FIG. 6B is a schematic cross-sectional view showing a state during the boring operation.

DESCRIPTION OF EMBODIMENTS

Figure 1:
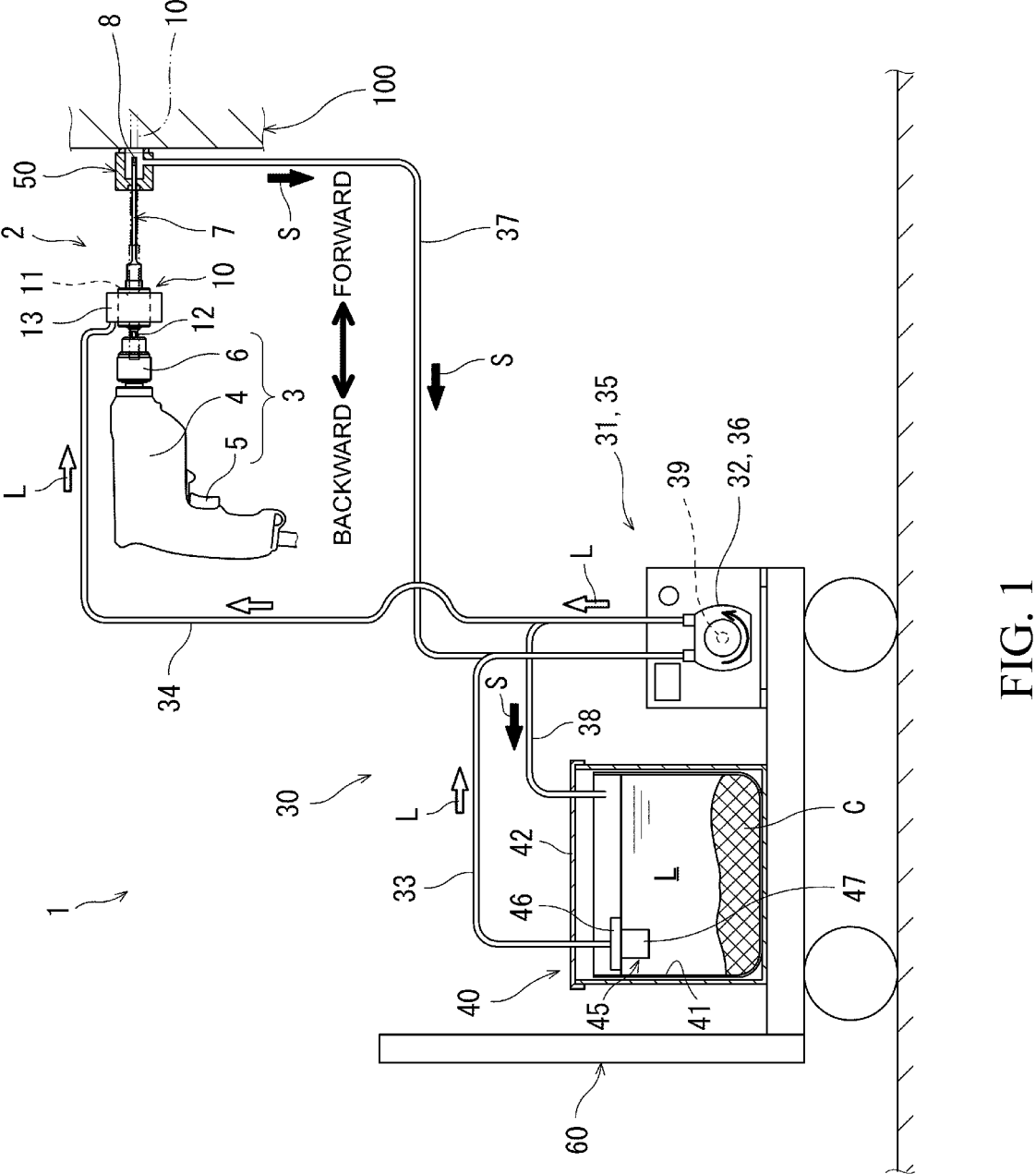
FIG. 1 is a schematic view showing the overall configuration of a first boring system according to a first embodiment of the present invention.

Hereinafter, embodiments of the present invention will be described with reference to the drawings. In these embodiments, boring systems 1 and 70 are described as examples. The boring system 1 or 70 bores a hole having a given depth in a workpiece 100 (such as a concrete wall or porcelain tile wall) by means of a tip 8 of a bit 7 attached to a boring device 2. The liquid used in the described examples is water L. The boring systems 1 and 70 are not limited to the embodiments described below, and various modifications may be made without departing from the gist of the present invention. The forward/backward direction in the specification and the claims corresponds to the forward/backward direction indicated in FIG. 1, in which the direction from the boring device 2 toward the tip 8 is defined as the forward direction.

(First Boring System According to First Embodiment)

FIG. 1 is a schematic view showing the overall configuration of a first boring system 1 according to a first embodiment. The first boring system 1 according to this embodiment includes: a boring device 2 for boring operations; a shield 50 that covers a boring area 101 of a workpiece 100 in which a hole is bored with a tip 8 of a bit 7 (cutting tool) attached to the boring device 2; and a liquid circulation system 30 for circulation of water L fed to the tip 8 of the bit 7. The shield 50 is biased forward by a biasing mechanism 20 mounted on the boring device 2.

The boring device 2 includes an electric drill 3, a liquid feed mechanism 10 attached to the electric drill 3, and the bit 7 attached to the liquid feed mechanism 10. The electric drill 3 includes a drill body 4, an operation switch 5 for actuating the drill body 4, and a holding mechanism 6 mounted on the front end of the drill body 4 to hold a shank 12 of the liquid feed mechanism 10. The liquid feed mechanism 10 includes a rotating member 11 that holds the proximal end of the bit 7 and rotates and a liquid feed member 13 from which the water L is fed. The rotating member 11 is located at the middle of the liquid feed mechanism 10, and the liquid feed member 13 is located around the rotating member 11. The liquid feed mechanism 10 will be described in detail later.

The boring device 2 rotates the holding mechanism 6 using rotation of a motor (not shown) mounted in the drill body 4, thereby rotating the bit 7 via the rotating member 11 of the liquid feed mechanism 10. The tip 8 of the rotating bit 7 is pressed against the workpiece 100 to perform a boring operation. During the boring operation, the water L is fed from the liquid feed mechanism 10 to the tip 8 of the bit 7. The feed of the water L to the space between the tip 8 and the workpiece 100 diminishes friction between the tip 8 and the workpiece 100 and reduces heat generation.

(Liquid Circulation System)

Figure 2:
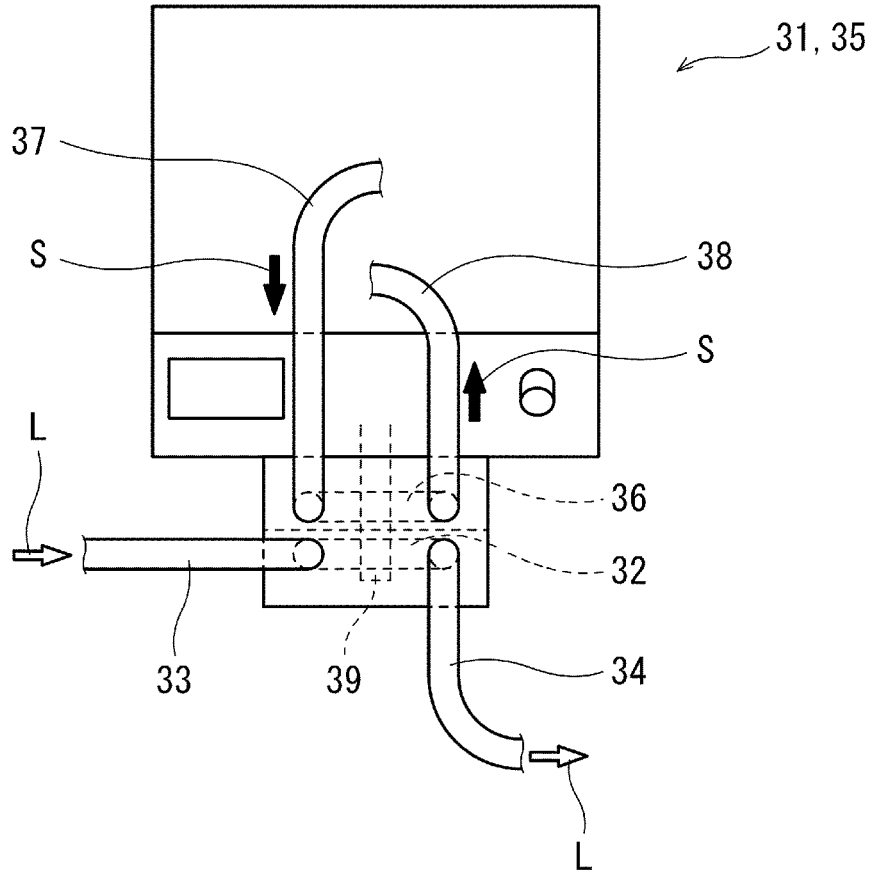
FIG. 2 is a plan view of tube pumps shown in FIG. 1.

FIG. 2 is a plan view of tube pumps 32 and 36 shown in FIG. 1. As shown in FIGS. 1 and 2, the liquid circulation system 30 according to this embodiment includes a liquid feeder 31 that forcibly feeds the water L from a liquid container 40 to the tip 8 through the liquid feed mechanism 10 of the boring device 2. The liquid circulation system 30 further includes a liquid collector 35 that forcibly collects a liquid suspension S, which is a mixture of the water L with chips C resulting from machining of the boring area 101 (the chips C include those resulting from boring a hole in the workpiece 100), from the shield 50 into the liquid container 40. The liquid container 40 includes, for example, an inner receptacle 41 that can hold up to about 4 to 5 liters of water L. The liquid feeder 31 according to this embodiment includes a first tube pump 32. The liquid collector 35 includes a second tube pump 36. The first and second tube pumps 32 and 36 according to this embodiment are integrated as a double tube pump. Inside the liquid container 40 there is a separator 45 for separating large ones of the chips C of the workpiece 100 from the liquid suspension S collected by the liquid collector 35.

(Liquid Feeder and Liquid Collector)

As shown in FIGS. 1 and 2, the duplex tube pump of this embodiment is configured such that the part for feeding the water L and the part for collecting the liquid suspension S are driven by a common drive shaft 39. The double tube pump may be one with a known structure. The first and second tube pumps 32 and 36 may be separate from each other, and any other known tube pumps may be used.

The liquid feeder 31 includes: a first feed channel 33 through which the water L is sucked by the first tube pump 32 from the liquid container 40 holding the water L; and a second feed channel 34 through which the water L is fed from the first tube pump 32 to the liquid feed mechanism 10 of the boring device 2. The first feed channel 33 has an upstream end connected to the separator 45 located in the liquid container 40.

The liquid collector 35 includes: a first liquid collection channel 37 through which the liquid suspension S is forcibly collected by the second tube pump 36 from the shield 50; and a second liquid collection channel 38 through which the liquid suspension S is delivered from the second tube pump 36 to the liquid container 40.

Each of the first and second tube pumps 32 and 36 is configured such that a roller (not shown) rotated by the drive shaft 39 compresses the tube of the tube pump to create a vacuum that allows the liquid to be drawn into the tube. In the first and second tube pumps 32 and 36, only the tubes are in contact with the liquid. Thus, even the liquid suspension S containing the chips C can be reliably delivered. The first tube pump 32 may be, for example, a tube pump capable of feeding the water L to the liquid feed mechanism 10 of the boring device 2 at a rate of about 100 to 150 milliliters per minute.

(Separator)

The separator 45 according to this embodiment is disposed to float on the water L held in the inner receptacle 41 of the liquid container 40. The separator 45 includes a float 46 that exhibits buoyancy at least in the vicinity of the liquid level of the liquid suspension S and a strainer 47 movable together with the float 46 in the liquid suspension S to separate large ones of the chips C from the liquid suspension S. The separator 45 is attached to the upstream end of the first feed channel 33. In the liquid suspension S held in the liquid container 40, some of the chips C and any other matter settle out under their own weight. The separator 45 removes large ones of the chips C (chips C that are so large that they cannot pass between a sliding member 17 and the rotating member 11 of the liquid feed mechanism 10 or between an incline 17a and a sealing member 15 of the liquid feed mechanism 10; e.g., chips having a size of about 1 mm) from the upper portion of the water L through the strainer 47, and the water L from which the chips C have been removed is sucked up.

The separator 45 may be one that includes a filter (not shown) located in the inner receptacle 41 of the liquid container 40 to separate the chips C. The separator 45 need not be used if large chips C do not get mixed in with the water L fed from the liquid container 40 to the tip 8 of the boring device 2. The separator 45 is not limited to the above-mentioned configurations.

(Liquid Feed Mechanism)

Figure 3:
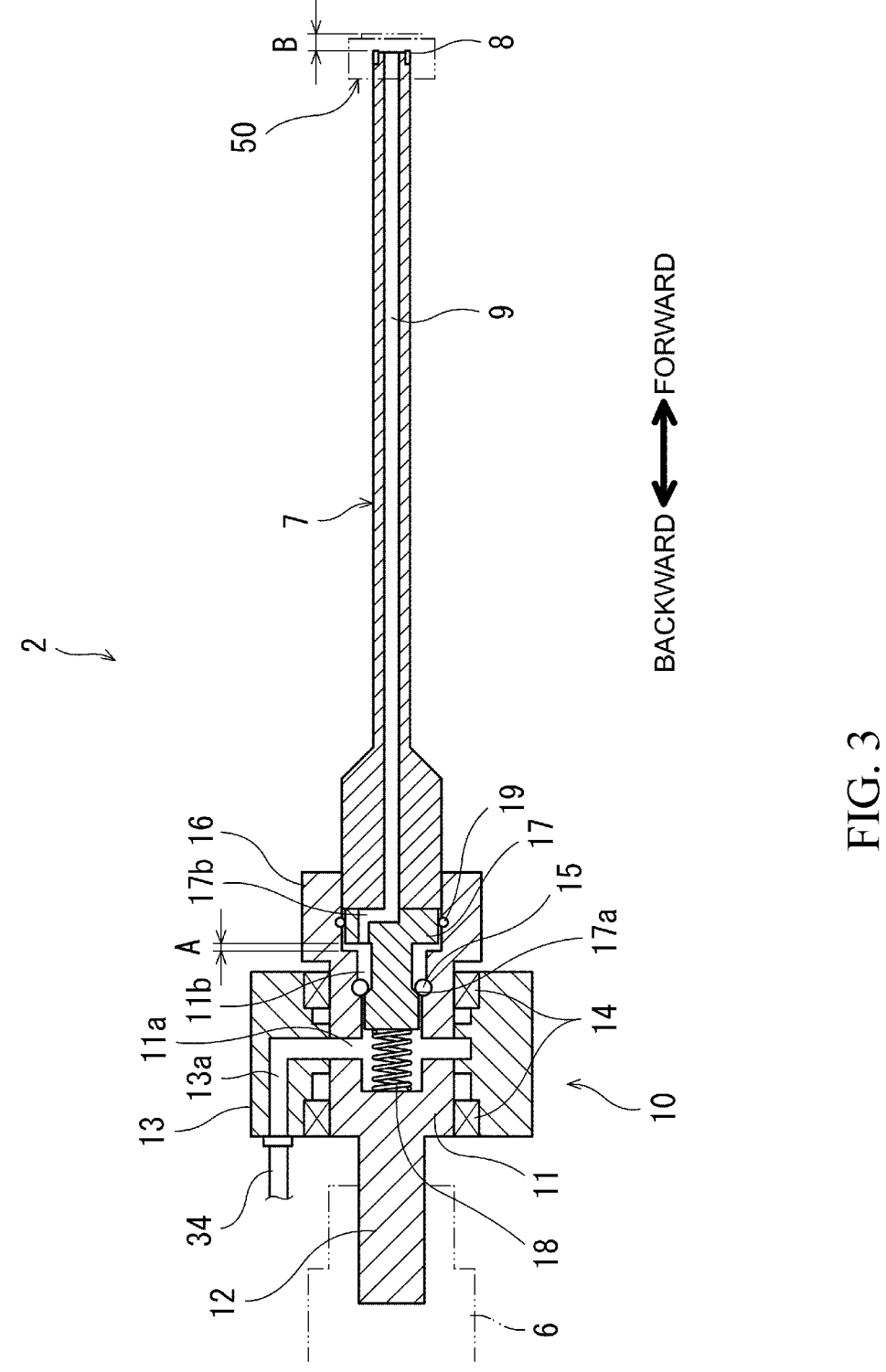
FIG. 3 is a schematic cross-sectional view showing a liquid feed mechanism of a boring device in the first boring system of FIG. 1.

FIG. 3 is a schematic cross-sectional view showing the liquid feed mechanism 10 of the boring device 2 in the first boring system 1 of FIG. 1. The liquid feed mechanism 10 of this embodiment includes: the rotating member 11 including a shank 12 held by the holding mechanism 6 of the electric drill 3; and the liquid feed member 13 located around the rotating member 11. The liquid feed member 13 is kept from rotating by bearings 14 located between the liquid feed member 13 and the rotating member 11. The second feed channel 34 is connected to the liquid feed member 13. The liquid feed member 13 includes an internal feed channel 13a, which communicates with a feed channel 11a of the rotating member 11.

A bit retainer 16 that holds the proximal end of the bit 7 is located at the front of the rotating member 11. The proximal end of the bit 7 is inserted into and held by the bit retainer 16. The detailed mechanism for holding the proximal end of the bit 7 is not shown in the drawings. Any known technique can be used in the mechanism for holding the proximal end of the bit 7.

Inside the rotating member 11 there is a sliding member 17 that is movable a given distance in the forward/backward direction while keeping contact with the proximal end of the bit 7. The sliding member 17 is biased forward by a biasing member 18 (spring) located inside the rotating member 11. At the rear of the sliding member 17 there is an incline 17a along which the diameter of the sliding member 17 increases backward. The biasing force of the biasing member 18 causes the incline 17a to be in contact with a sealing member 15 mounted at a given location on the rotating member 11. The front of the sliding member 17 is sealed by a sealing member 19 located between the sliding member 17 and the bit retainer 16. O-rings can be used as the sealing members 15 and 19. The sliding member 17 is slidable backward against the biasing force of the biasing member 18 within a given width of gap A between the sliding member 17 and the rotating member 11.

A space 11b between the sliding member 17 and the rotating member 11 communicates with a liquid feed hole 9 of the bit 7 via a feed channel 17b of the sliding member 17. The liquid feed hole 9 extends from the proximal end to the tip 8 of the bit 7.

As shown in FIG. 3, in a state where the sliding member 17 is biased forward by the biasing member 18, the incline 17a is in contact with the sealing member 15, and the feed channel 11a and the space 11b are disconnected from each other. In this state, the water L fed to the liquid feed member 13 through the second feed channel 34 does not flow from the feed channel 11a to the space 11b.

Once the sliding member 17 is pushed from the direction of the bit 7 (the state of FIG. 6B described later), the sliding member 17 moves backward against the biasing force of the biasing member 18 within the given width of gap A. In this state, the incline 17a is away from the sealing member 15, and the feed channel 11a and the space 11b are in communication, so that the water L fed through the second feed channel 34 flows from the feed channel 11a to the space 11b.

Thus, with the bit 7 attached to the bit retainer 16, the water L is fed to and stops in the liquid feed mechanism 10, and upon backward pushing of the bit 7 the water L fed to the liquid feed mechanism 10 flows through the liquid feed hole 9 of the bit 7 and is delivered from the tip 8 to the boring area 101 (FIG. 1).

In this embodiment, the given width of gap A within which the sliding member 17 moves in the forward/backward direction is smaller than an initial gap B (FIG. 1 and FIG. 6B) between the front surface of the shield 50 biased forward by the biasing mechanism 20 and the tip 8 of the bit 7. Thus, the incline 17a of the sliding member 17 moves away from the sealing member 15 after the front surface of the shield 50 is first brought into contact with the workpiece

100 and then the bit 7 is pushed into the initial gap B by a distance corresponding to the given width of gap A. As such, the water L is delivered from the tip 8 to the workpiece 100 against which a sealing member 58 of the shield 50 is being pressed (FIG. 6B), and the water L can be prevented from leaking through a gap between the shield 50 and the workpiece 100. The above relationship between the given width of gap A and the initial gap B is merely an example, and the relationship between the gaps A and B is not limited to that in this embodiment.

(Shield)

Figure 4A:
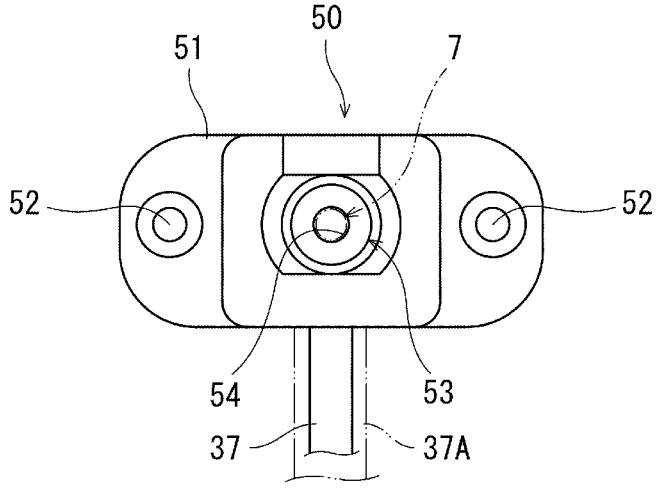
FIGS. 4A and 4B show a shield of the first boring system of FIG. 1.
Figure 4B:
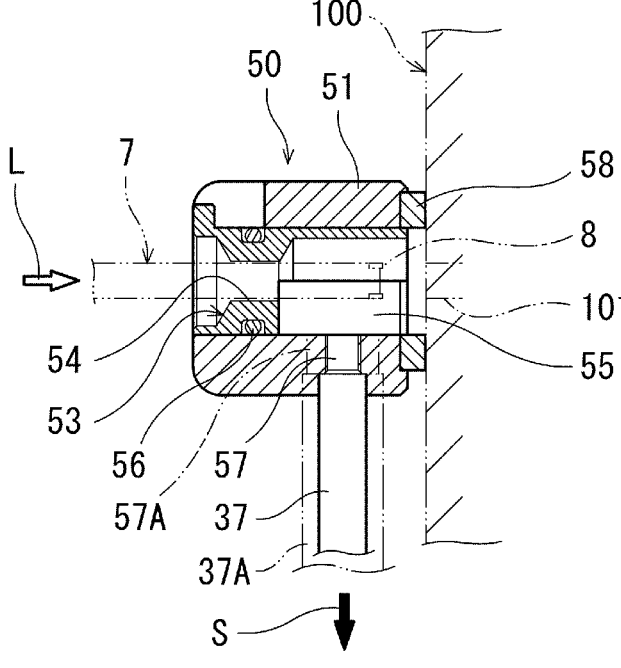

FIGS. 4A and 4B show the shield 50 of the first boring system 1 of FIG. 1. FIG. 4A is a schematic view of the shield 50 as viewed from the direction of the boring device 2, and FIG. 4B is a cross-sectional view of the shield 50 taken along a vertical plane passing through the center of the shield 50. The shield 50 of this embodiment includes a horizontally long main body 51 and couplers 52 located at both longitudinal ends of the main body 51. To the couplers 52 are coupled sliders 25 of the biasing mechanism 20 of FIG. 5. A guide member 53 that guides the front of the bit 7 in the forward/backward direction is located at the middle of the main body 51. The guide member 53 includes a guide 54 located at the middle of the guide member 53 to guide the bit 7 and a cavity 55 located at the front of the guide member 53. A sealing member 56 is located between the guide member 53 and the main body 51 to prevent the liquid suspension S from leaking through a gap between the guide member 53 and the main body 51. An O-ring can be used as the sealing member 56.

The sealing member 58 that contacts the workpiece 100 is located on the front surface of the main body 51. The sealing member 58 seals the periphery of the cavity 55 and at the same time seals the periphery of the boring area 101. A sponge or rubber material can be used as the sealing member 58.

At the bottom of the main body 51 there is a collection hole 57 extending from the cavity 55 toward the outside of the main body 51. The first liquid collection channel 37 is connected to the collection hole 57. The liquid suspension S is drawn from the cavity 55 into the first liquid collection channel 37 through the collection hole 57. A hole indicated by a dashed-double dotted line is an example of a large-diameter collection hole 57A in a second boring system 70 shown in FIG. 7 described later. An upstream first liquid collection channel 37A with a large diameter, which will be described later, is connected to the large-diameter collection hole 57A.

(Biasing Mechanism)

Figure 5:
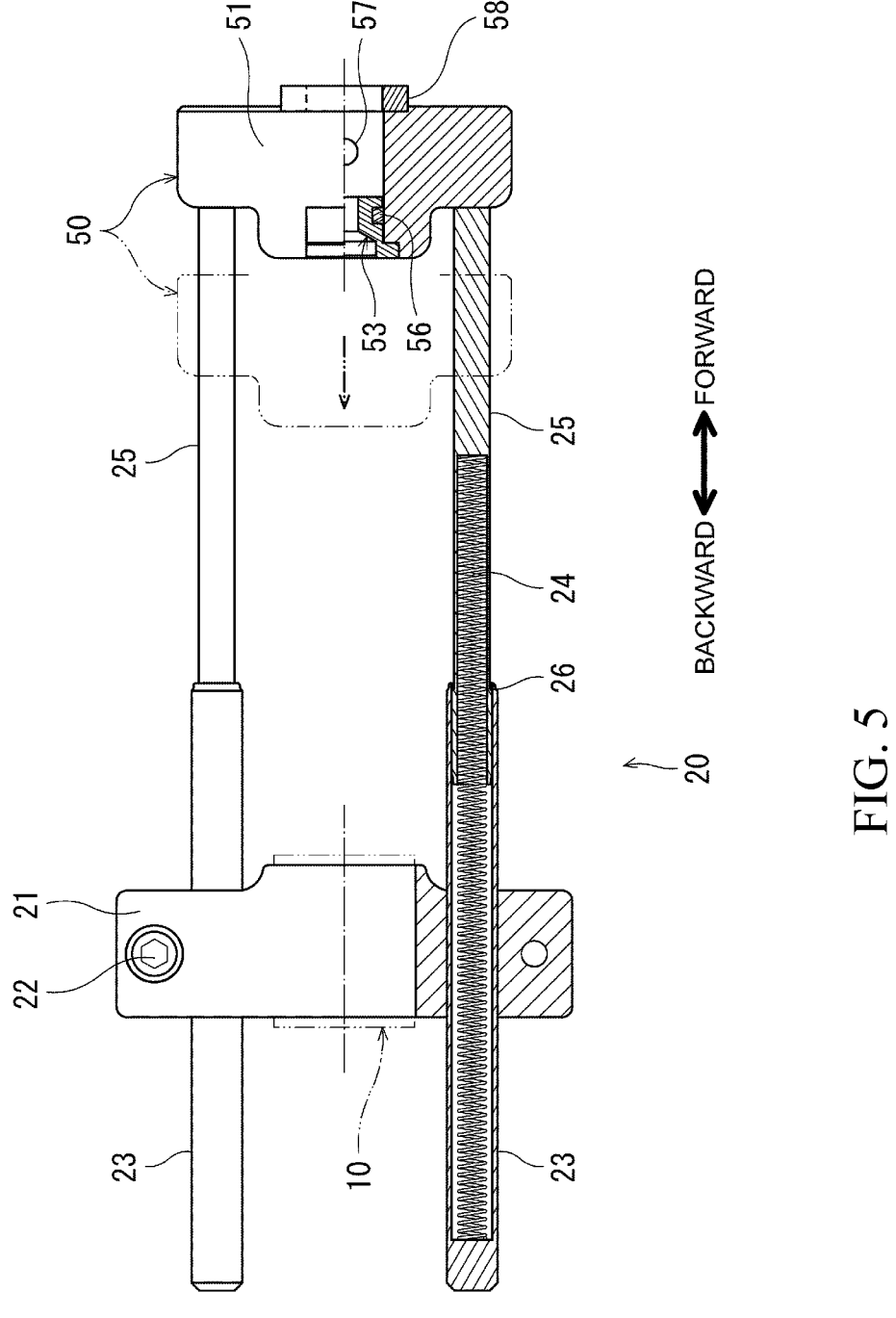
FIG. 5 is a schematic plan view of a biasing mechanism that biases the shield of FIGS. 4A and 4B toward a workpiece.

FIG. 5 is a schematic plan view of the biasing mechanism 20 that biases the shield 50 of FIGS. 4A and 4B toward the workpiece 100. FIG. 5 is a half cross-sectional view. The biasing mechanism 20 of this embodiment includes a main body 21 mounted on the liquid feed mechanism 10 of the boring device 2. The main body 21 is secured to the outer surface of the liquid feed mechanism 10.

The main body 21 is fitted with two guides 23 extending in the forward/backward direction and two sliders 25 slidable along the guides 23, the guides 23 and sliders 25 being located to the left and right of the liquid feed mechanism 10. The guides 23 are inserted into holes of the main body 21 and fastened at opposite left and right points by fastening bolts 22, thus being secured to the main body 21. Each of the sliders 25 is biased forward by a biasing spring 24 (biaser) located inside a corresponding one of the guides 23. The forward sliding of each slider 25 is prevented by a holder 26 (stepped portion) located at the front end of the corresponding guide 23, and the slider 25 is held at a given position as shown in FIG. 5. Each slider 25 is slidable backward from the shown position against the biasing force of the biasing spring 24.

The shield 50 is secured to the front ends of the sliders 25. Thus, the shield 50 is movable backward together with the sliders 25 against the biasing forces of the biasing springs 24.

(Example of Boring Operation)

Figure 6A:
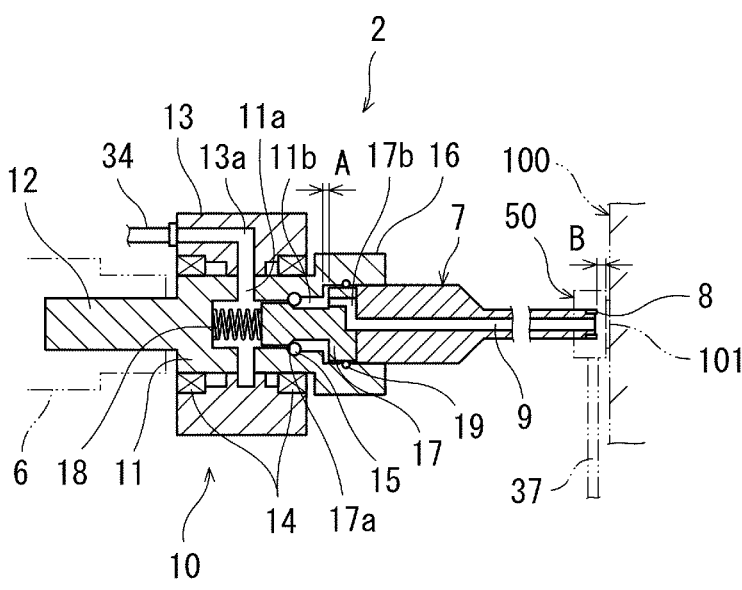
FIGS. 6A and 6B show how the liquid feed mechanism of FIG. 3 works during a boring operation.
Figure 6B:
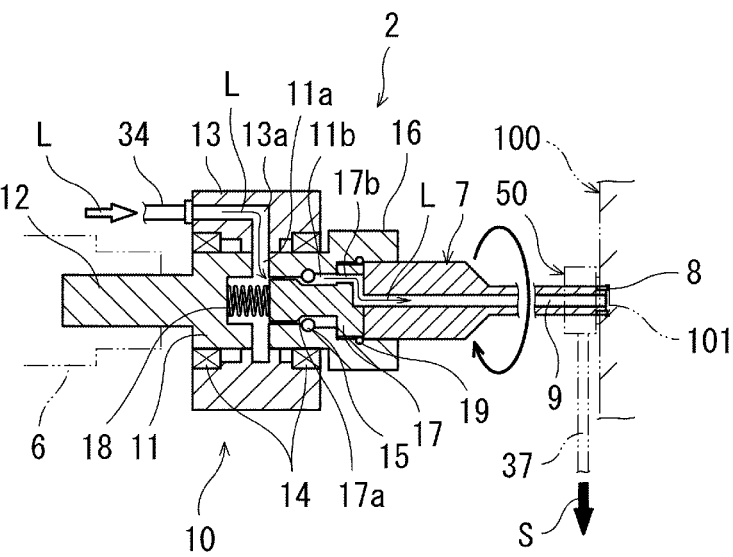

FIGS. 6A and 6B show how the shield 50 and biasing mechanism 20 of FIG. 5 work during a boring operation. FIG. 6A is a schematic cross-sectional view showing a state before the boring operation, and FIG. 6B is a schematic cross-sectional view showing a state during the boring operation. An example where the above first boring system 1 is used to bore a hole in the workpiece 100 will be described with reference to FIGS. 1, 6A, and 6B.

First, the components of the first boring system 1 are connected to one another as shown in FIG. 1. Subsequently, the tube pumps 32 and 36 are turned on, and the tip 8 of the boring device 2 is placed toward the boring area 101 of the workpiece 100. In this state, the first tube pump 32 of the liquid feeder 31 acts to feed the water L from the liquid container 40 to the liquid feed mechanism 10 of the boring device 2. However, as shown in FIG. 6A, the sliding member 17 of the liquid feed mechanism 10 is in contact with the sealing member 15 and closes the end of the feed channel 11a, and thus the water L fed from the liquid container 40 does not flow ahead of the feed channel 11a. The second tube pump 36 of the liquid collector 35 sucks air from the cavity 55 (FIG. 4B). In this state, the sealing member 58 of the shield 50 attached to the boring device 2 is placed in contact with the boring area 101 of the workpiece 100.

Subsequently, as shown in FIG. 6B, the operation switch 5 on the drill body 4 is operated to rotate the bit 7, and the tip 8 of the rotating bit 7 is pressed against the workpiece 100. This leads to the shield 50 being pressed against the workpiece 100 with a suitable force by the biasing mechanism 20. Additionally, as the tip 8 of the bit 7 is pressed against the workpiece 100, the proximal end of the bit 7 causes the sliding member 17 to move backward within the given width of gap A against the biasing force of the biasing member 18.

Thus, the incline 17a of the sliding member 17 moves away from the sealing member 15, and the feed channel 13a of the liquid feed member 13 is brought into communication with the liquid feed hole 9 of the bit 7 via the feed channel 11a of the rotating member 11, the space 11b, and the feed channel 17b of the sliding member 17. As such, the water L fed from the liquid feeder 31 to the liquid feed mechanism 10 is delivered from the tip 8 of the bit 7 to the boring area 101 while a hole is being bored in the workpiece 100 by the tip 8 of the bit 7. The liquid suspension S in the cavity 55 of the shield 50 is forcibly collected into the liquid container 40 through the first and second liquid collection channels 37 and 38 by the action of the second tube pump 36 of the liquid collector 35.

As described above, the tip 8 of the rotating bit 7 is pressed against the workpiece 100 located ahead of the tip 8, and thus a hole is bored in the boring area 101 of the workpiece 100 by the tip 8. During the boring operation, the water L held in the liquid container 40 is forcibly fed from the tip 8 of the boring device 2 to the boring area 101 by the action of the first tube pump 32, while the liquid suspension S, which is a mixture of the water L with the chips C of the workpiece 100 machined by the tip 8, is forcibly collected from the shield 50 into the liquid container 40 through the first and second liquid collection channels 37 and 38.

In the liquid suspension S collected by the liquid collector 35 and held in the liquid container 40, large ones of the chips C settle out. Those of the chips C which float in the upper portion of the liquid container 40 are removed by the strainer 47, and the water L from which the chips C have been removed is fed again to the tip 8 through the first and second liquid feed channels 33 and 34. That is, when the water L to be fed to the tip 8 of the bit 7 attached to the boring device 2 is recovered from the liquid suspension S held in the liquid container 40, the subsurface portion of the liquid suspension S, which contains a smaller amount of chips C than the rest of the liquid suspension S, is passed through the strainer 47 of the separator 45. As such, the water L little contaminated by the chips C is circulated to the tip 8 of the boring device 2. Furthermore, the use of the tube pumps 32 and 36 allows for proper circulation of the water L even if the water L is somewhat contaminated by the chips C.

Thus, with the use of the first boring system 1 described above, the liquid circulation system 30 ensures water circulation in which backflow is reliably prevented by combination of proper feed of the water L to the tip 8 and forcible collection of the liquid suspension S, while a proper boring operation can be performed on the workpiece 100 by means of the boring device 2.

Additionally, in the above first boring system 1, the liquid suspension S is forcibly collected from the shield 50 covering the boring area 101. Thus, the water L can be properly circulated even in a boring operation during which the boring device 2 is oriented downward. As such, boring operations with varying orientations of the boring device 2 can be performed properly.

(Second Boring System According to Second Embodiment)

Figure 7:
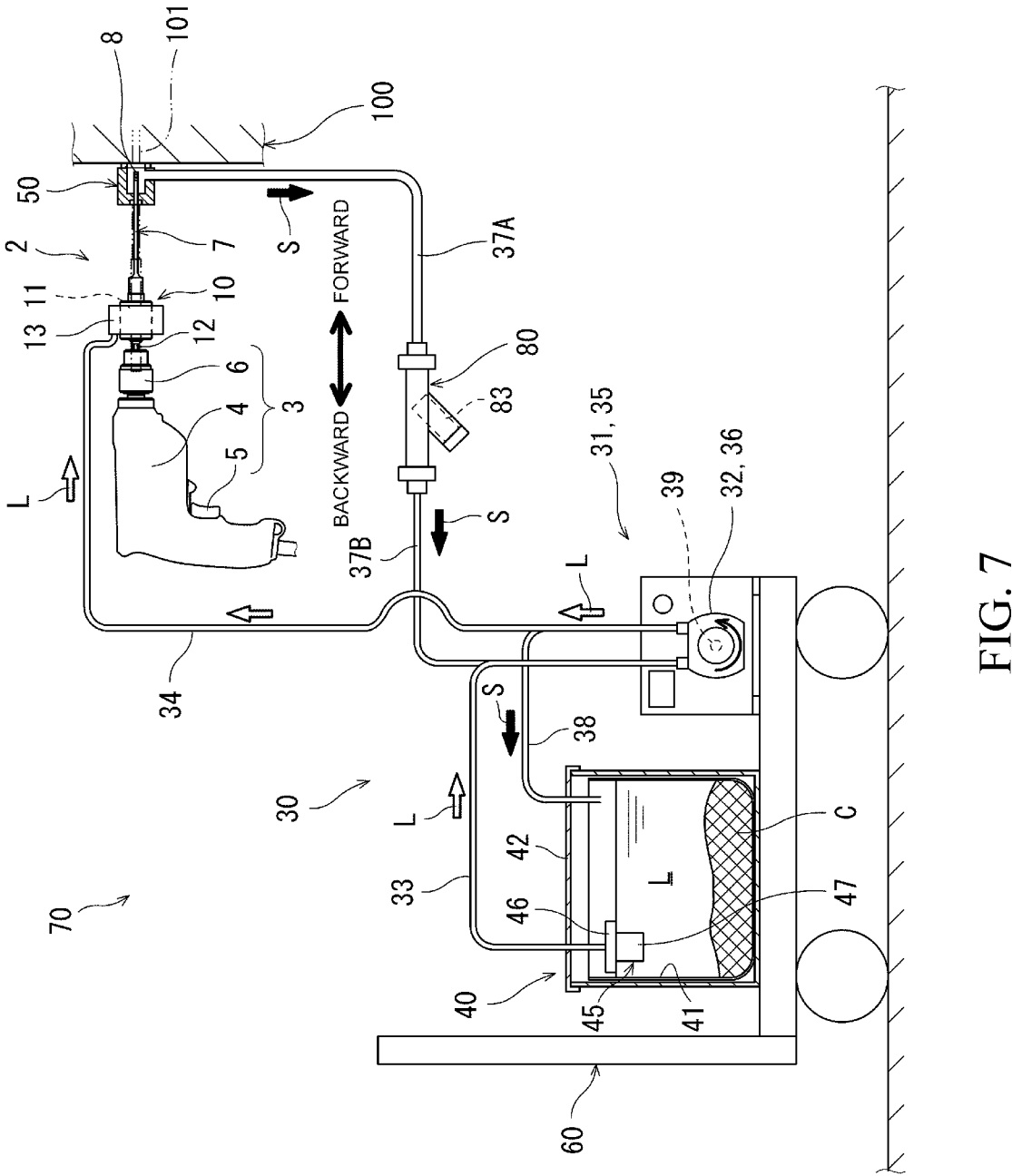
FIG. 7 is a schematic view showing the overall configuration of a second boring system according to a second embodiment of the present invention.
Figure 8:
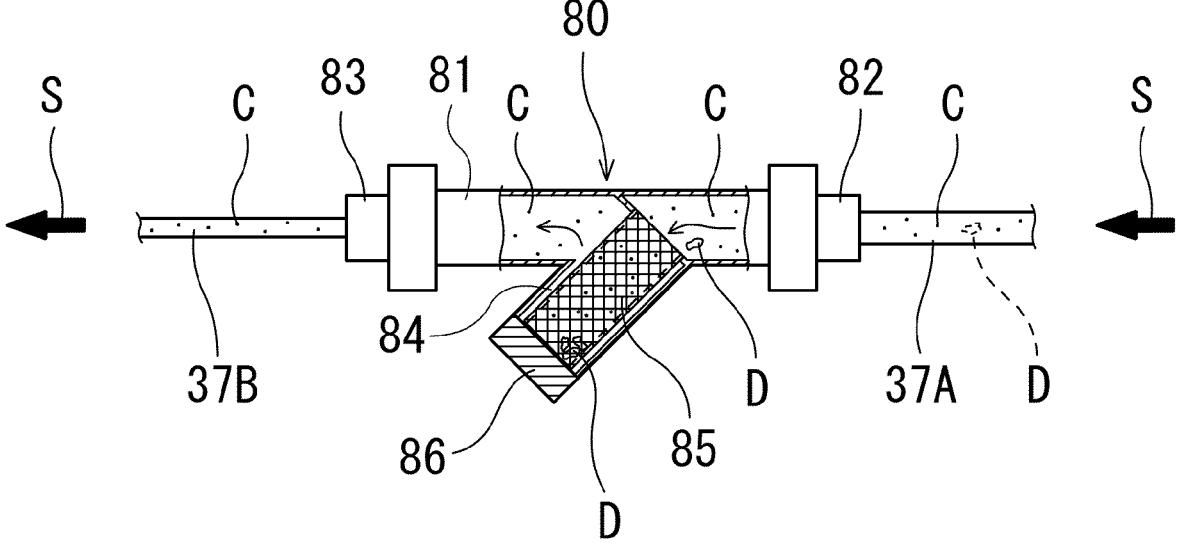
FIG. 8 is an enlarged partially cut-away view showing a strainer located in a liquid collection channel of the second boring system of FIG. 7.

FIG. 7 is a schematic view showing the overall configuration of a second boring system 70 according to a second embodiment. FIG. 8 is an enlarged partially cut-away view showing a strainer 80 located in a liquid collection channel of the second boring system 70 of FIG. 7. The second boring system 70 differs from the first boring system 1 in the configuration of the first liquid collection channel 37 extending between the shield 50 and the second tube pump 36. The second boring system 70 will be described with a focus only on the part that distinguishes the second boring system 70 from the first boring system 1. The components of the second boring system 70 that are the same as those of the first boring system 1 are denoted by the same reference signs and will not be described again. The second boring system 70 can be used in a boring operation during which the chips C resulting from hole boring with the tip 8 could include large fragments D (e.g., fragments with a size of 3 to 5 mm).

As shown in FIG. 7, the second boring system 70 includes the strainer 80 located between an upstream first liquid collection channel 37A and a downstream first liquid collection channel 37B which extend between the shield 50 and the second tube pump 36. The upstream first liquid collection channel 37A extending between the shield 50 and the strainer 80 has a larger diameter than the downstream first liquid collection channel 37B extending between the strainer 80 and the second tube pump 36, and the downstream first liquid collection channel 37B has the same diameter as a channel (second liquid collection channel 38) other than the channels 37A and 37B. The shield 50 to which the upstream first liquid collection channel 37A is connected includes a large-diameter collection hole 57A (FIG. 4B) tailored to the diameter of the upstream first liquid collection channel 37A. For example, the diameter of the downstream first liquid collection channel 37B may be from about 6 to 8 mm while the diameter of the upstream first liquid collection channel 37A is from about 10 to 12 mm. The diameter of the upstream first liquid collection channel 37A may be from about 1.2 to 2 times, and preferably about 1.5 times, the diameter of the downstream first liquid collection channel 37B. The diameter of the upstream first liquid collection channel 37A and the large-diameter collection hole 57A of the shield 50 may be defined depending on the size of the large fragments D (FIG. 8) which would arise from hole boring with the tip 8.

As shown in FIG. 8, the strainer 80 includes a hollow cylindrical strainer main body 81, an upstream strainer inlet 82 to which the upstream first liquid collection channel 37A is connected, and a downstream strainer outlet 83 to which the downstream first liquid collection channel 37B is connected. The strainer 80 of this embodiment includes a filter support 84 located at the bottom of the strainer main body 81 and inclined downward in the downstream direction, and a filter 85 in the shape of a hollow cylinder is attached to the filter support 84. The filter 85 has a lower end closed by a closure member 86 closing the lower end of the filter support 84. The filter 85 communicates with the upstream channel at the central portion of the hollow cylindrical shape and communicates with the downstream channel at the outer circumferential portion of the hollow cylindrical shape. The filter 85 may be a metal mesh filter with a mesh size suitable for the size of the large fragments D to be trapped.

With the use of the strainer 80, the liquid suspension S coming into the strainer main body 81 through the upstream first liquid collection channel 37A enters the central portion of the filter 85, gets out of the circumferential portion of the filter 85, and flows into the downstream first liquid collection channel 37B. Thus, the large fragments D contained in the liquid suspension S are trapped by the filter 85. Generally, the amount of the large fragments D generated during one day is not large. Thus, boring operations can be carried out all day without interruption while retaining the large fragments D on the filter 85. The large fragments D trapped by the filter 85 can be discharged by removing the closure member 86. The strainer 80 of this embodiment is merely an example. The strainer 80 is not limited to that of this embodiment, and another form of strainer can be used.

Each of the first and second boring systems 1 and 70 of the above embodiments includes a cart 60 for carrying the liquid container 40 and the first and second tube pumps 32 and 36. Thus, the entire system can easily be transferred to the site where a boring operation is to be performed. The transfer of the entire system can easily be accomplished also by using a backpack or shoulder bag instead of the cart 60. In the case where the electric drill 3 of the boring device 2 is equipped with an internal battery, the system can easily be transferred with the liquid container 40 placed on the cart 60. This makes it easier to change the site where a boring operation is to be performed. Additionally, the boring operation can be properly performed even if the workplace is relatively narrow. The electric drill 3 of the boring device 2 is not limited to being equipped with an internal battery. The electric drill 3 may be supplied with electric power through a power cord.

OTHER VARIANTS

Although in the embodiments described above the liquid feed mechanism 10 attached to the electric drill 3 is fitted with the biasing mechanism 20 that biases the shield 50 toward the workpiece 100, the biasing mechanism 20 may be mounted on the drill body 4.

Although in the embodiments described above the liquid used is the water L, the liquid may be other than the water L. The liquid is not limited to particular types and may be any type of liquid capable of diminishing the friction between the tip 8 and the workpiece 100 and cooling the tip 8 which generates heat due to the friction with the workpiece 100.

The embodiments described above are merely examples, and numerous modifications and other embodiments of the present invention are obvious to those skilled in the art. Accordingly, the foregoing description is to be construed as illustrative only, and is provided for the purpose of teaching those skilled in the art the best mode for carrying out the present invention. The structural and/or functional details may be substantially modified without departing from the gist of the present invention.

LIST OF REFERENCE CHARACTERS

1 first boring system
2 boring device
7 bit
8 tip
9 liquid feed hole
10 liquid feed mechanism
11 rotating member
13 liquid feed member
15 sealing member
16 bit retainer
17 biasing member
18 sealing member
20 biasing mechanism
23 guide
24 biasing spring (biaser)
25 slider
30 liquid circulation system
31 liquid feeder
32 first tube pump
33 first liquid feed channel
34 second liquid feed channel
35 liquid collector
36 second tube pump
37 first liquid collection channel
37A first liquid collection channel
37B first liquid collection channel
38 second liquid collection channel
40 liquid container
45 separator
46 float
47 strainer
50 shield
54 guide
55 cavity
56 sealing member
57 collection hole
57A collection hole
58 sealing member
70 second boring system
80 strainer
83 filter
84 closure member
100 workpiece
101 boring area
A given width of gap (given distance)
B initial gap L water (liquid)
S liquid suspension
C chips
D large fragments

The invention claimed is:

1. A liquid circulation system comprising:
a shield that covers a boring area of a workpiece in which a hole is bored with a tip of a bit attached to a boring device;
a liquid container that holds a liquid;
a liquid feeder configured to forcibly feed the liquid held in the liquid container to the tip; and
a liquid collector configured to forcibly collect a liquid suspension from an area shielded by the shield and return the liquid suspension to the liquid container, wherein
the liquid feeder includes a first tube pump configured to forcibly feed part of the liquid held in the liquid container to the tip,
the liquid collector includes a second tube pump configured to forcibly collect the liquid suspension from the area shielded by the shield into the liquid container,
the liquid circulation system further comprises a switch configured to activate and stop the first and second tube pumps in conjunction with each other, and
the first tube pump and the second tube pump are driven by a common drive shaft.

2. The liquid circulation system according to claim 1, further comprising a strainer located in a liquid collection channel extending between the shield and the second tube pump.

3. The liquid circulation system according to claim 2, wherein
the liquid collection channel includes a portion extending between the shield and the strainer, and
the portion of the liquid collection channel has an inner diameter of 3 mm to 5 mm.

4. The liquid circulation system according to claim 1, wherein the shield includes a sealing member placeable around the boring area and in contact with the workpiece.

5. A boring system comprising the liquid circulation system according to claim 1, wherein the boring device includes: a liquid feed mechanism that opens and closes a feed channel for the liquid fed by the liquid feeder; and a biasing mechanism that biases the shield forward.

6. The boring system according to claim 5, wherein
the liquid feed mechanism includes a sliding member movable a given distance backward in the boring device together with the bit, and
the feed channel is opened in response to the sliding member moving the given distance.

7. The boring system according to claim 6, wherein
the tip of the bit is located away from a front surface of the shield in a direction toward the liquid feed mechanism, with a given width of initial gap being defined between the tip and the front surface of the shield, and
the given distance moved by the sliding member of the liquid feed mechanism is smaller than the initial gap.

8. The boring system according to claim 5, wherein the biasing mechanism includes: a guide extending from the boring device toward the shield; a slider having a front end to which the shield is secured, the slider being slidable under guidance of the guide, a biaser that biases the slider forward along the guide, and a holder that holds the slider at a given position.

* * * * *